SIGNAL CONTROLLED SWEEP CIRCUIT
Filed Nov. 30, 1966
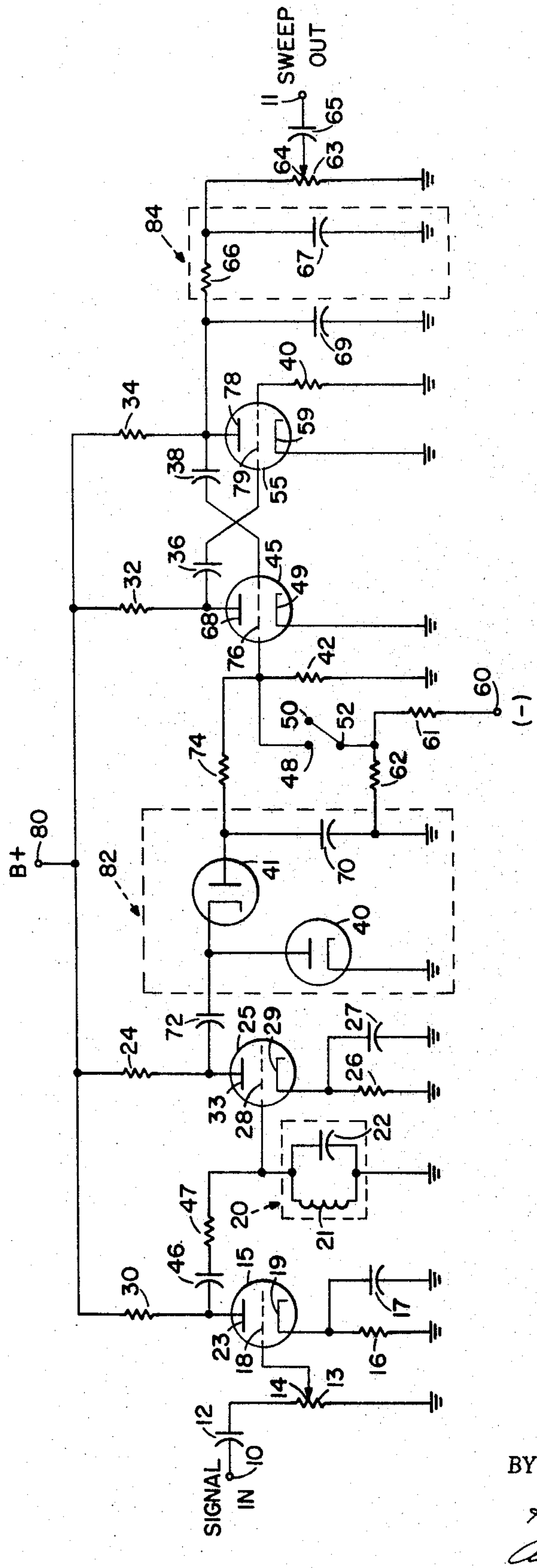
Edgar L. Potter Jr.,
INVENTOR.
Harry M. Saragovitz
BY Edward J. Kelly
Herbert Berl
Alfred E. Smith

United States Patent Office 3,524,140

Patented Aug. 11, 1970

3,524,140

SIGNAL CONTROLLED SWEEP CIRCUIT

Edgar L. Potter, Jr., Delmar, N.Y., assignor, by mesne assignments, to the United States of America as represented by the Secretary of the Army Filed Nov. 30, 1966, Ser. No. 598,126

Int. Cl. H03b *3/04;* H03k *4/10*

U.S. Cl. 328—181 1 Claim

ABSTRACT OF THE DISCLOSURE

A device for regaining the correct intermediate frequency signal in an automatic frequency control receiver when this signal has been lost. The receiver local oscillator is swept by a saw-tooth voltage, automatically produced in the device when the intermediate frequency has been lost, to assure that the incoming radio frequency signal will again be received and centered in the pass band of the receiver. The device includes a normally inoperative saw-tooth voltage generator. This generator is made operative when the intermediate frequency signal drifts or is lost. The generator includes a normally inoperative free running multivibrator and an integrator, and is made operative by a control circuit responsive to the loss of the intermediate frequency signal.

This invention relates to a signal controlled sweep circuit for regaining a signal in automatic frequency controlled (AFC) communicating systems. The signal controlled sweep circuit can be swept through a limited frequency range to assure automatically regaining lost or drifting intermediate frequency (IF) signals in the receiver.

In known closed loop systems where there is a possibility of intermittent interruption of the loop, a means is provided to automatically close the loop as soon as conditions are restored to normal. In the event the receiver local oscillator has drifted during the period of lost signal, a means of sweeping through a limited frequency range is provided to assure that the the radio frequency signal which is once again present will be received and centered in the pass band of the receiver.

The term AFC, as applied to a receiving system, denotes an arrangement for automatically keeping the frequency of the receiver local oscillator at the value required to produce the desired IF, in spite of the normal tendency of the receiver local oscillator frequency to drift with temperature changes, line voltage changes, etc. The circuit described herein is used in regaining a signal in AFC circuits when this signal has been lost. The receiver local oscillator is swept through a limited frequency range by a saw-tooth voltage applied to the oscillator and automatically stopped when the signal is again present.

In the present invention, pulses of a modulating frequency signal in automatic frequency control are present at a signal input terminal. These pulses, and noise voltages, are amplified, and all frequencies, except the modulating frequency, are passed through a band pass filter to ground. The remaining modulating frequency signal is further amplified. Also, the amplified signal is rectified and doubled in a voltage doubling circuit. The voltage doubling circuits charge a capacitor to a negative value corresponding to twice the value of the amplified positive signal. This negative value holds a free running multivibrator below cutoff. When the operating frequency is lost to the input, the voltage multiplier circuit ceases to function and the negatively charged capacitor discharges to ground, thereby tripping the free running multivibrator into conduction. The free running multivibrator oscillates at a frequency close to the frequency of the receiver local oscillator. The square wave output signal from the multivibrator is applied to a DC integrator circuit and produces linear saw-tooth voltage signals therefrom. These linear saw-tooth voltages are applied to the receiver local oscillator. These saw-tooth voltages cause the receiver local oscillator to sweep a band of frequencies in which there is a frequency capable of producing the desired IF.

It is an object of this invention to regain a signal in AFC circuits when this signal has been lost.

It is a further object of this invention to provide means for sweeping through a limited frequency range to assure centering of the IF signal that has drifted during a time of lost signal.

Other objects and the attendant advantages, features, and uses will become more apparent to those skilled in the art in view of the following description taken with the accompanying drawing wherein the single figure illustrates a schematic diagram of a preferred embodiment of the present invention.

Referring now to the drawing, the input signal at terminal 10 is applied to grid 18 of amplifier tube 15 through coupling capacitor 12 and set-sweep-start-level potentiometer 13, by way of contact 14. Plate 23 of amplifier tube 15 is connected to a positive B+ potential source 80 through resistor 30. Cathode 19 of amplifier tube 15 is connected to ground through the parallel connection of resistor 16 and capacitor 17. The output of amplifier 15 is applied to grid 28 of amplifier tube 25 through the series connection of capacitor 46 and resistor 47. All frequencies, except the frequencies desired to be applied to grid 28, are passed through band pass filter 20 to ground. The band pass filter consists of inductor 21 and capacitor 22. Cathode 29 of amplifier tube 25 is connected to ground through the parallel network of resistor 26 and capacitor 27. The output of amplifier tube 25 is applied to voltage multiplier circuit 82 through capacitor 72. Voltage multiplier circuit 82 consists of rectifiers 40 and 41 and capacitor 70. The cathode of diode 40 and one side of capacitor 70 are connected directly to ground.

A voltage 60 is connected through resistor 61 to wiper terminal 52 associated with a two-way switch. One side of resistor 62 is connected to ground and the other side of resistor 62 is connected to wiper terminal 52. Resistor 74 is connected from the anode of rectifier 41 to grid 76 of electron tube 45. Resistor 42 is connected from ground to terminal 48 of the two-way switch and is further connected to grid 76 of electron tube 45. Wiper arm 52 is connected to terminal 50 under normal operation of the circuit. Wiper arm 52 may be connected to terminal 48 for directly applying a negative voltage from terminal 60 to grid 76 of tube 45.

A free running multivibrator is composed of electron tubes 45 and 55, each having an anode, a grid and a cathode denoted as 68 and 78, 76 and 79, and 49 and 59, respectively. Anode 68 is connected to positive B+ potential source 80 through resistor 32. Anode 78 is also connected to positive B+ potential source 80, through resistor 34. Capacitor 36 is cross-coupled from anode 68 of electron tube 45 to grid 79 of electron tube 55. Capacitor 38 is cross-coupled from anode 78 of electron tube 55 to grid 76 of electron tube 45. Grid 79 of electron tube 55 is connected to ground through resistor 40. Cathode of electron tube 45 is connected directly to ground. Cathode 59 of electron tube 55 is connected directly to ground.

The output signal from the free running multivibrator is applied to a receiver local oscillator input terminal 11. The signal comes from plate 78 of electron tube 55 to one side of capacitor 69 as a square wave voltage. The other side of capacitor 69 is connected to ground. The signal is integrated in integrator circuit 84 consisting of resistor 66 and capacitor 67. The signal comes from the integrator circuit as a linear saw-tooth and is applied to terminal 11 through set-sweep-width potentiometer 63, contact 64 and capacitor 65.

Operatively, a 1 k.c. modulating frequency signal is present at terminal 10. Its amplitude is proportional to the setting on the set-sweep-start-level potentiometer 13 of contact 14, which, in turn, determines the signal amplitude on grid 18 of electron tube 15.

The input signal, plus noise, is amplified in electron tube 15 and is fed to the band pass filter 20 through capacitor 46 and resistor 47. All frequencies, with the exception of 1 k.c., are passed to ground through band pass filter 20. This is true because the resonant frequency value of inductor 21 and capacitor 22 of band pass filter 20 is 1 k.c. and thus sets up a high impedance for that frequency. The 1 k.c. signal is further amplified in electron tube 25 and is applied to voltage multiplier circuit 82 where it is rectified and doubled. The voltage rectified by diodes 40 and 41 will appear as a negative voltage across capacitor 70. This negative voltage is applied to grid 76 of oscillator tube 45, thus holding it at cutoff. Now, with a loss of the 1 k.c. signal at terminal 10, voltage multiplier circuit 82 will cease to function and the negative charge on capacitor 70 will leak off to ground through resistors 74 and 42. With the resulting decrease in negative voltage on grid 76, electron tube 45 will begin conducting, and the free running multivibrator consisting of electron tubes 45 and 55 will begin normal operation, producing square wave voltage signals across capacitor 69 at a frequency close to the frequency of the receiver local oscillator. The square wave voltage is integrated in direct current integrator circuit 84. This voltage appears as a linear saw-tooth voltage across the set-sweep-width potentiometer 63 for application to local oscillator input terminal 11 through contact 64 and capacitor 65. The receiver local oscillator (not shown) is swept through a limited frequency range of the linear saw-tooth voltage until the desired 1 k.c. frequency is present again at terminal 10. Capacitor 70 is again charged negatively resulting in cutoff of saw-tooth voltage producing multivibrator consisting of electron tubes 45 and 55.

When switch terminal 52 is closed on terminal 48, negative bias from terminal 60 is applied to grid 76 of electron tube 45 and prevents oscillation of the free running multivibrator. The local oscillator and mixer can then be tuned.

The circuit may be operated for frequencies other than 1 k.c. example as described. If more than one modulating frequency is present, the circuit can be made selective to any one or to any group of frequencies by filtering out the undesirable signals. Also, to make the circuit sensitive to pulses, the addition of a pulse stretcher or single shot multivibrator ahead of amplifier tube 15, set with an "on" period of approximately one-half of the pulse repetition rate, will operate the circuit.

Obviously, many modifications and variations of the present invention are possible in the light of the above teachings. It is, therefore, to be understood that within the scope of the appended claim, the invention may be practiced otherwise than as specifically described.

I claim:

1. A signal controlled sweep circuit for sweeping a receiver local oscillator through a limited frequency range comprising: an input terminal for receiving an input signal; an output terminal; means providing a linear saw-tooth voltage at said output terminal, said means including a free running multivibrator with an integrator connected to the output of said multivibrator; and control means responsive to said input signal for maintaining said saw-tooth voltage means in a quiescent state and responsive to the absence of said input signal for placing said saw-tooth voltage means in an active state wherein said control means includes a voltage doubling circuit connected between said input terminal and said multivibrator, and first and second amplifiers having a band pass filter connected therebetween, the first of said amplifiers connected to said input terminal and the second of said amplifiers connected to an input of said voltage doubling circuit, said band pass filter permitting only signals of a selected frequency to appear at the input of said second amplifier.

References Cited

UNITED STATES PATENTS

| | | | |
|---|---|---|---|
| 2,434,294 | 1/1948 | Ginzton | 331—4 |
| 3,218,571 | 11/1965 | Shannon et al. | 331—4 |
| 2,787,727 | 4/1957 | Maure et al. | 328—181 XR |
| 3,011,068 | 11/1961 | McVey | 307—228 |

DONALD D. FORRER, Primary Examiner

J. ZAZWORSKY, Assistant Examiner

U.S. Cl. X.R.

307—228; 328—140; 331—4, 178